A. GODFREY.
APPARATUS FOR CUTTING METALS AND THE LIKE BY A CUTTING FLAME.
APPLICATION FILED JUNE 13, 1919.

1,357,859.

Patented Nov. 2, 1920.
8 SHEETS—SHEET 3.

INVENTOR
Alfred Godfrey
By. Laurence Langan
Attorney

A. GODFREY.
APPARATUS FOR CUTTING METALS AND THE LIKE BY A CUTTING FLAME.
APPLICATION FILED JUNE 13, 1919.

1,357,859.

Patented Nov. 2, 1920.

INVENTOR
Alfred Godfrey
By *Laurence Langner*
Attorney

A. GODFREY.
APPARATUS FOR CUTTING METALS AND THE LIKE BY A CUTTING FLAME.
APPLICATION FILED JUNE 13, 1919.

1,357,859.

Patented Nov. 2, 1920.

INVENTOR
Alfred Godfrey
By *Laurence Langner*
Attorney

A. GODFREY.
APPARATUS FOR CUTTING METALS AND THE LIKE BY A CUTTING FLAME.
APPLICATION FILED JUNE 13, 1919.

1,357,859.

Patented Nov. 2, 1920.
8 SHEETS—SHEET 8.

Fig.12.

INVENTOR
Alfred Godfrey
By Lawrence Langner
Attorney

UNITED STATES PATENT OFFICE.

ALFRED GODFREY, OF LONDON, ENGLAND.

APPARATUS FOR CUTTING METALS AND THE LIKE BY A CUTTING-FLAME.

1,357,859.  Specification of Letters Patent.  Patented Nov. 2, 1920.

Application filed June 13, 1919. Serial No. 304,038.

*To all whom it may concern:*

Be it known that I, ALFRED GODFREY, a subject of the King of Great Britain, and residing at Boundary Road, Westbury avenue, Wood Green, London, England, have invented certain new and useful Improvements in Apparatus for Cutting Metals and the like by a Cutting-Flame, of which the following is a specification.

This invention relates to the cutting of metals by means of a cutting flame such as that produced with an oxy-acetylene burner. It is the object of this invention to provide a machine comprising a cutter head with means for controlling its movement and operation in order to enable blanks of a great variety of shapes to be cut out with ease and accuracy. Another object is to provide means in such a machine for enabling the cutting operation to be stopped and restarted whenever required with a minimum of trouble. Other objects are to provide improved cutting means adjustable to any angular position for controlling the movement of the cutter head, to provide also for the movement of the cutter head around a templet, to provide for the accurate setting of the cutter head to a starting position on the work, to provide for the accurate movement of the cutter head always at the right distance away from the work, and to provide stops which will limit the movement of the cutter head, or the setting of the valves controlling the supply of gas thereto whereby the flame itself is controlled. These and other objects which will appear from the following description are obtained by the machine hereinafter described with reference to the accompanying drawings.

In the drawings:—

Fig. 6 is a partial elevation at right angles to Fig. 4, while

Fig. 7 is a sectional elevation taken on the line VII—VII of Fig. 6.

Referring first to Figs. 1 to 3, 10 is a base, preferably formed with slots 11 to receive any suitable form of stand to carry the work piece to be operated on. In the example illustrated in Fig. 1, the stand marked 12 is clamped in one of the slots in the base, and has a revoluble head 13 which can be clamped in any angular position with respect to a graduated plate 14. This head in turn is slotted, and is shown as carrying the footpiece 15 of a vise. The vise has a head 17 with a stem 16 threaded in its lower part, while on its upper part slides the jaw 19 adjustable in height by the collar 18 screwing on the stem. The work piece 20 is clamped between the head 17 and jaw 19, and as the head is the stationary part, the top of the work piece or blank to be cut is always held at the right height for the cutter flame to operate upon it. The jaw 19 may be formed with a bracket 21 to receive a notched block 22 for holding rods or bars when such are to be cut, as indicated in dotted lines at 23 in Fig. 1.

Figure 2:
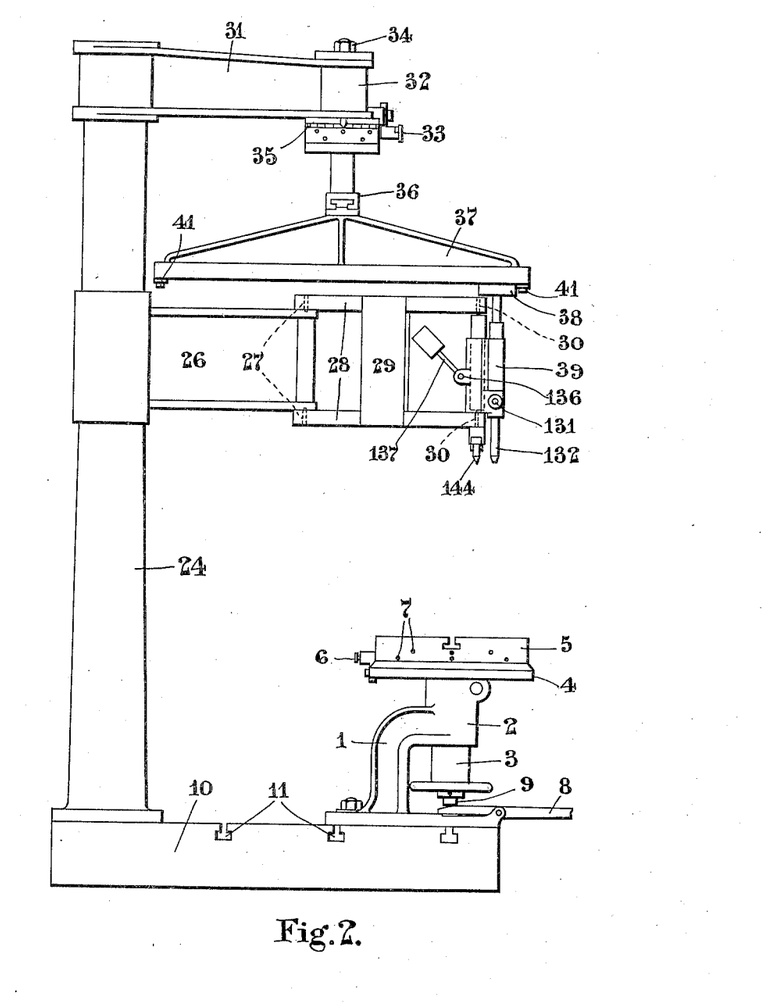
Fig. 2 is another elevation showing the same machine arranged for making straight cuts at any required angle on an object, and also illustrating a modified form of work table.

In Fig. 2 the machine is shown with a work table of such a construction that the work may be raised for cutting and instantly lowered when required to bring the work piece away from the cutting flame. This table comprises a stand 1 which carries a boss 2 having a vertical hole bored therein to receive the pillar 3 on which the table top rests. This table top consists of two members, an upper and lower, the lower one 4 being fixed rigidly to the pillar 3, while the upper member 5 is rotatably mounted with relation to the member 4. A detent 6 is arranged to engage with the member 5 at specified points 7 for the purpose of locking the table in position where blanks of regular polygonal outline have to be cut. The detent 6 is carried in a vertcally adjustable guide so that it may be brought to the level of either set of holes 7 according to the angular position of the table which is required. The one set of holes, for instance, may be at 30° apart, while the other set may be at 45° in order to provide for sufficient variety of adjustments without the necessity of setting against a scale for example. For the purpose of allowing the work to be lowered away from the cutting flame the pillar 3 is arranged so as to be capable of vertical movement by means of a pedal 8 working against a member 9 adjustably screwed into the pillar 3. When the cutting operation is to commence the pedal 8 is depressed and the work piece consequently brought into proximity to the cutting flame. On releasing the pedal the table immediately falls and the work piece is withdrawn from the flame.

The column 24 carrying the cutter head, is preferably mounted at one corner of the base 10, and has a circumferentially adjustable collar on it with lugs 25 (Fig. 3) in which is pivoted in hardened steel centers a flanged plate 26 forming one element of the swinging support for the cutter head. The second element consists of a frame carried on the plate 26 by hardened steel centers at 27, and comprising bars 28 connected by a plate 29. The cutter head is carried at the end of the frame 28 in centers at 30 (Fig. 2) in which it can turn. The details of the cutter head will be hereinafter set forth.

At the top of the column 24 is a circumferentially adjustable arm 31 with a boss 32 carrying a head which can be adjusted to and locked in any angular position by means of the nut 34, or a detent 33 may be used corresponding with that shown at 6 on the table in Fig. 2 for locking the head in certain angular positions likely to be frequently used. The head may be graduated as at 35 for accurate setting. This head carries a cross slide 36 in which may be carried a transverse cross slide 37, a shoe 38 sliding therein being used in this case for guiding or holding the cutter head 39, while a locking screw 72 is provided for locking the slide 37 in position. Either or both of the members 36, 37, may be provided with graduations for accurate setting of members sliding therein. Adjustable stops 40 on the cross slide 36 are provided for limiting the travel of the transverse cross slide 37, while corresponding stops 41 are provided on the transverse cross slide 37 for limiting the travel of the shoe 38 therein. The head also carries a slidably mounted member 42 which is locked in position by a set screw 47, and this member in its turn carries a plate 43 having a wooden plate 44 attached thereto to which the templet 45 may be quickly attached by small nails for example. The cutter head is guided around the outline of the templet by its upwardly projecting pin 50 bearing thereon. In order to prevent any undue vibration a distance piece 46 is inserted between the templet 45 and the wooden plate 44, and the pin 50 is provided with a head which travels between the plate 44 and templet 45 and so minimizes any vertical movement of the cutter head.

Figure 1:
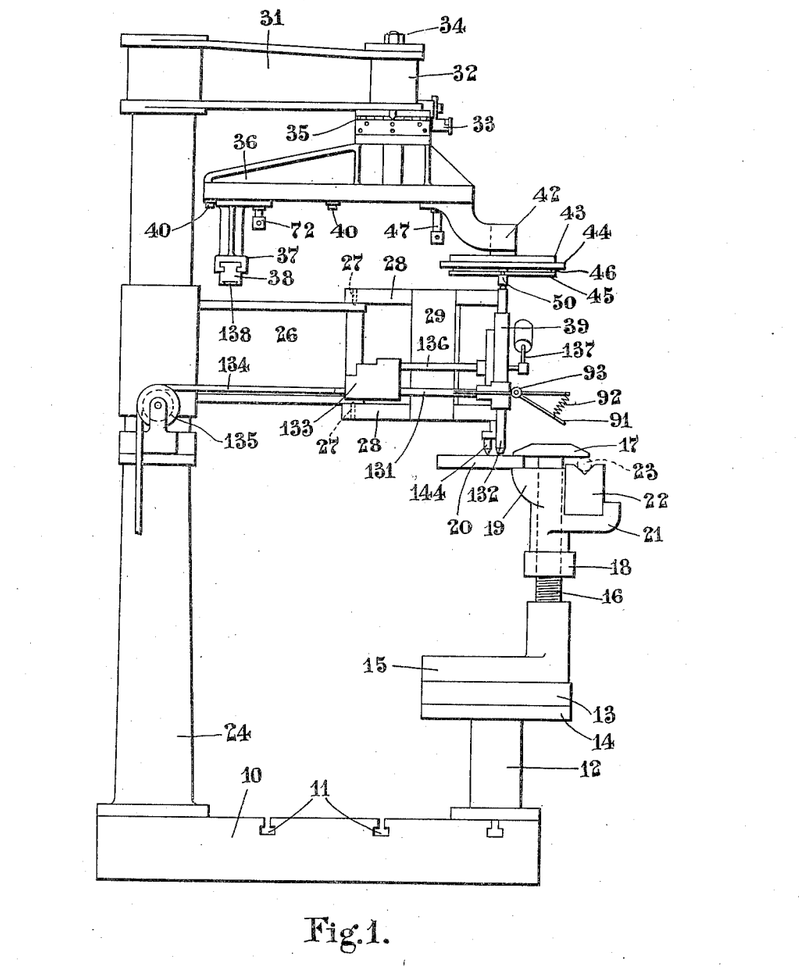
Figure 1 is an elevation showing one form of the machine arranged for use in cutting objects to a set pattern.

The cutter head is only shown diagrammatically in Fig. 1, wherein 131 is the pipe fitting conveying gases to the nozzle 132, and 133 represents the fitting including the cocks for controlling the flow of gases. The pipes 134 conveying the gases for example, from supplies under pressure in cylinders, are preferably led to the fitting 133 around a guide pulley 135 on the column. Owing to the way in which the cutter head is carried, it can be moved about to bring the nozzle 132 into any position while the pipes 131, 134 remain in radial position with respect to the column, so that there is no risk of entangling the pipes no matter what cutting operation is being performed. A shaft 136 carried in the cutter head, and having a weighted hand lever 137 at its end, serves to raise and lower the cutter head as required in stopping or re-starting the cutting operations, and preferably operates valves in the fitting 133, as hereinafter described, to cut off the gas supply automatically whenever the nozzle 132 is lifted, so as to avoid waste of gas and damaging of the work if the cutter is stopped while over this latter. The rasing of the cutter head and the cutting off of the gas supply thereto, may easily be made to take place automatically if required in conjunction with stops such as 41, Fig. 2, if the weighted hand lever 137, instead of being arranged to be thrown over past a dead center position, is arranged normally to fall in lifting the cutter head, being held up by a detent, or if the weight is replaced by a spring with a detent; the weight or spring tending to turn the shaft and raise the cutter head is allowed to act when the detent is released on coming into contact with the stop when the cutting operation is stopped. This is not illustrated, as arrangements wherein weights or springs held up by detents are used, are known for a variety of other purposes, and can readily be adapted to this purpose if required.

In Fig. 2, the cutter head is only partially indicated, turned at right angles to the plane of the paper, and with the shaft 136 and pipe 131 cut off close to the head 39, so as to allow the supporting frame 26, 28 to be shown clearly. For igniting the flame at any time, gas may be brought by a pipe and a swiveling connection at 93, to a tube 91, which is normally held up out of the way by means of a spring 92, Fig. 1. The tube 91 has a by-pass jet at its end, and it can be pressed down momentarily whenever required to light the flame.

The numeral 144 indicates a member which can be used either as a distance piece for preventing the cutter head from approaching too near the work, or as a tracer for tracing out the path of the cutting flame beforehand. This device is described in detail with reference to Fig. 12.

With the machine as described so far, it will be seen that a great variety of operations can be performed as follows: With the work held stationary, the cutter head can be moved around any pattern or templet such as 45, Fig. 1, to cut out the work to the same pattern. If a plate is to be cut to any angular form, this may be done by setting the cross slides 36 and 37 to the successive angular positions with respect to the supporting head 32, as indicated by the graduations at 35, or as determined by the use of the detent 33, and guiding the cutter head over the work by the shoe 38 traveling along the slide 37.

Figure 3:
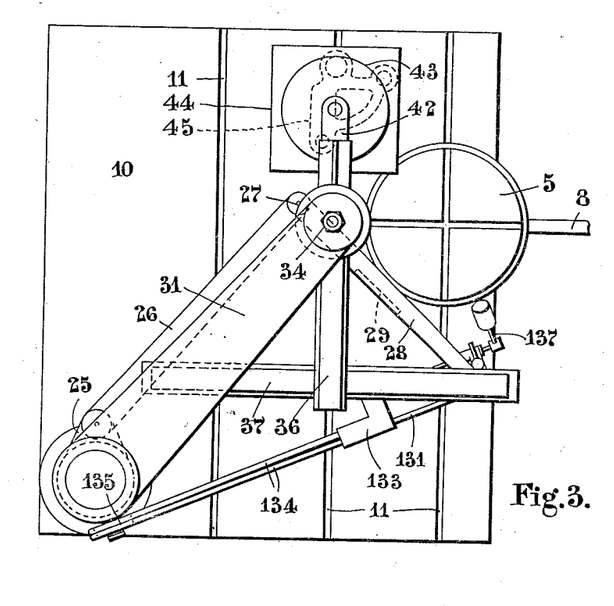
Fig. 3 shows a plan view of the machine illustrated in Figs. 1 and 2.
Figure 4:
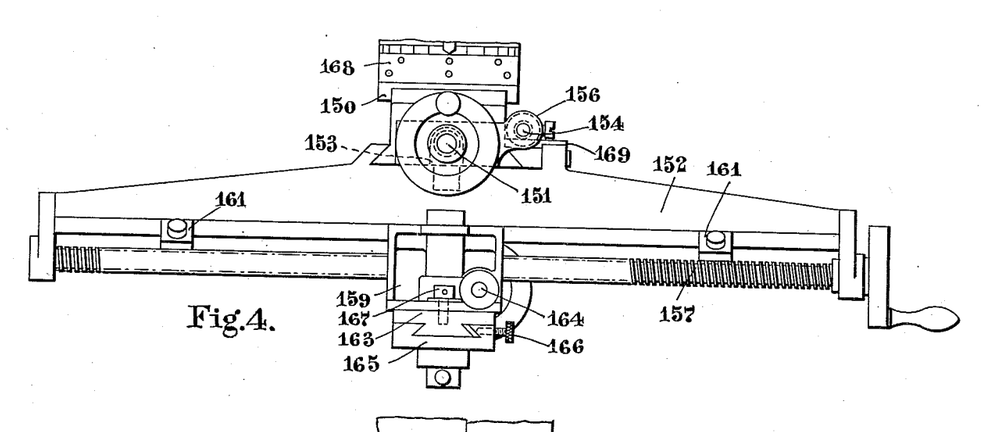
Fig. 4 shows a detail view in elevation of an appliance which can be used in connection with the machine shown in Figs. 1 to 3 for certain purposes.
Figure 5:
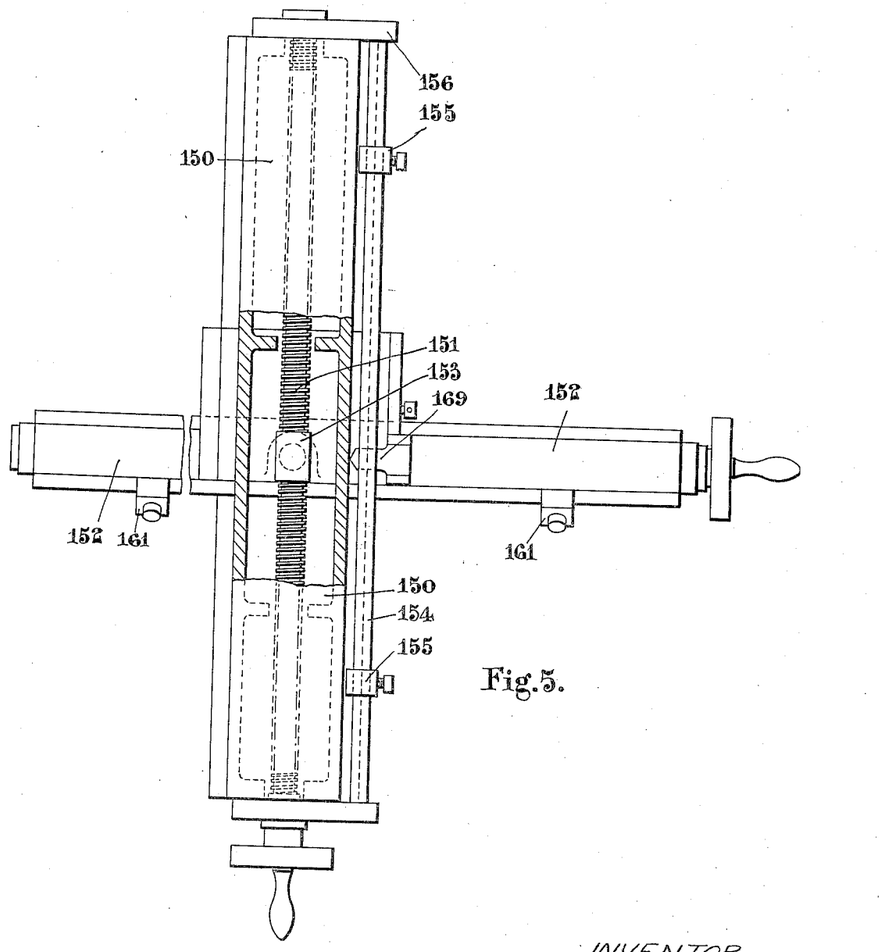
Fig. 5 is a plan view, partly in section, of Fig. 4.
Figures 6, 7:
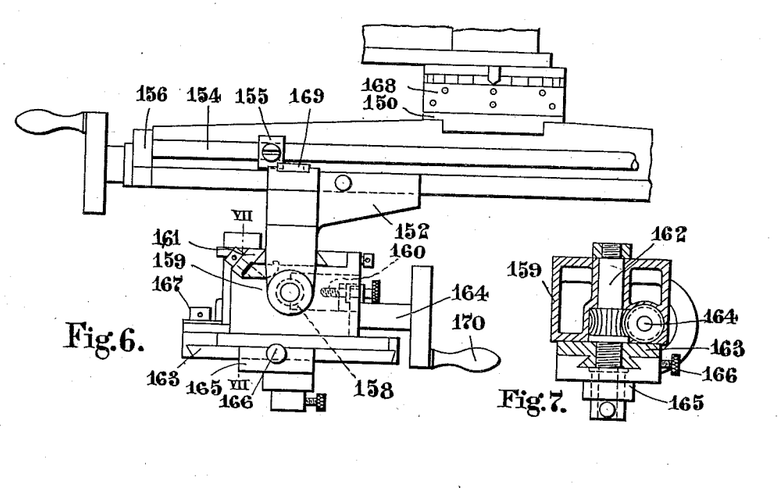

Figs. 4 to 7 show an attachment which may be substituted for that shown in Figs. 1 to 3. This arrangement is designed for work of a heavier character than would be done with the arrangement shown in Figs. 1 to 3. As will readily be seen, the part 168 corresponds with the graduated head 35 shown in Figs. 1 and 2, and attachment is effected exactly as in the arrangement shown in Figs. 1 to 3. A head 150 has a feed screw 151 (Fig. 5) mounted therein which operates a transverse slide member 152 through a nut 153 suitably attached thereto. A stop rod 154 with stops 155 adjustably mounted thereon is supported between two end pieces 156 mounted on the member 150, the said rod and stop serving in coöperation with the abutment 169 on the transverse slide member 152 to limit the amount of feed required in this direction. The abutment member 169 is shown in Fig. 5 as having a pointer projecting therefrom which may read against a scale on the guide member 150, in order to provide for the adjustment of the cross slide 152 to accurately spaced positions. This is useful when cutting a succession of holes at readily spaced intervals with the device about to be described. On the transverse slide member 152 a feed screw 157 (Fig. 4) is arranged to engage with a part-nut 158 mounted on the slide carriage 159. This part-nut 158 is disengaged from the feed screw by turning the milled head of the screw 160 (Fig. 6) which is in threaded engagement with the body of the part-nut 158. Adjustable stops 161 are provided on the side of the member 152 for the purpose of limiting the amount of feed required.

The slide member 159 has a vertical shaft 162 rotatably mounted thereon (see Fig. 7), the lower end of which shaft is screwed into a swing 163, while the shaft itself is rotated by means of the hand-operated shaft 164 which engages through worm gearing with the shaft 162. On the swing member 163 the cutter head holder 165 is slidably mounted, being held in any position by means of the set screw 166. With this arrangement, to cut out a circle the holder 165 is set at the required radius from the center of the shaft 162 and the shaft 164 is rotated by its handle 170 until the member 163 has gone through a complete revolution. By using this circle cutting device in conjunction with any of the above described feed mechanisms of the attachment, straight rows or rings of spaced holes or circles may be cut with ease. When it is not required to cut circles, the member 163 is locked in the position shown in the drawings, by means of the set screw 167 which engages in a recess formed in the said member.

Figure 8:
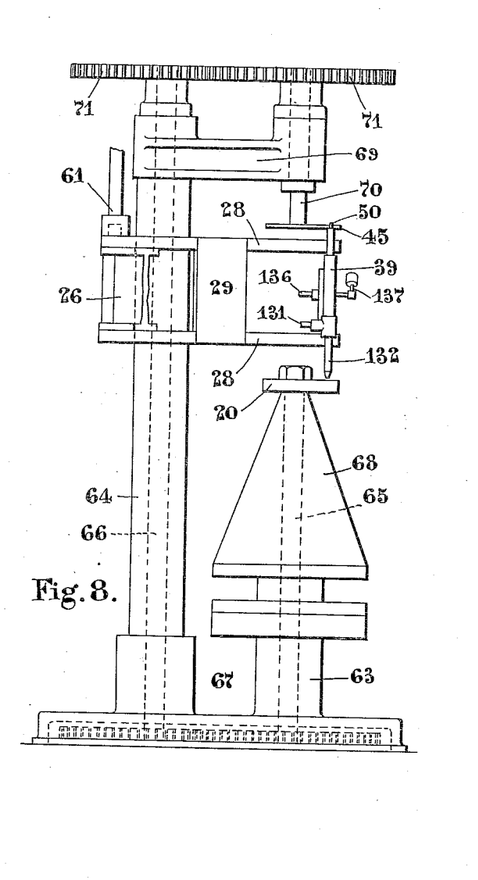
Fig. 8 is an elevation.
Figure 9:
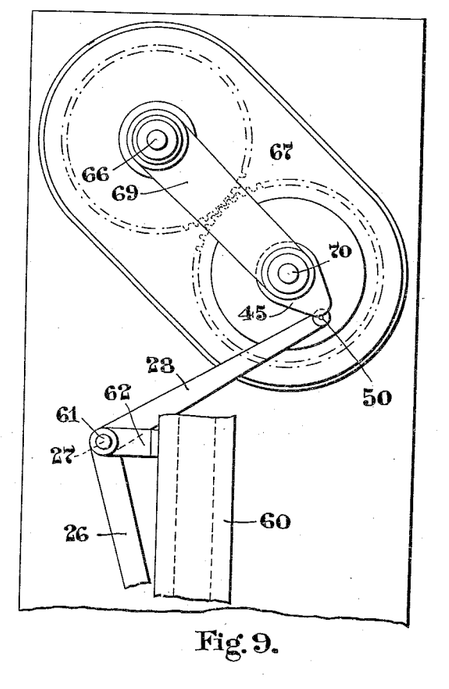
Fig. 9 is a partial plan view illustrating the application of the invention wherein the object to be cut is carried on a revoluble table.

Figs. 8 and 9 illustrate a modified method of cutting out work according to patterns or templets. The column carrying the linked frame 26, 28 which supports the cutter head 41, is not shown, but it may be similar to the column 24, and has an arm 60 projecting from it, with a bracket 62 carrying a rod 61 whose lower end can be engaged with the link frame at the joint 27 so as to leave only the arm 28 free to turn about the center 27. Two columns 63 and 64 are provided, the one carrying the work piece 20 and the other the templet 45, both of which are arranged to be rotated in synchronism. For this purpose upright shafts 65 and 66 respectively are provided in the columns, connected by gearing 67 in the base, the work piece 20 being clamped by suitable means at the top of shaft 65. The shaft is shown as carrying a deflector cone 68 for spreading the flame outwardly after it passes through the plate to be cut, so that the supporting shaft or the vise holding the work thereon shall not be damaged. The column 64 carries an arm 69, in the end of which rotates a spindle 70 carrying the templet 45, this spindle being connected to the shaft 66 by gears 71. The details of the cutter are not shown, particularly in the plan view, Fig. 9, where only the pin 50 on the end of the frame 28 indicates the position of the cutter head. It may be the same of course as in other figures, being raised to stop the operation when required by throwing over the weighted lever 137, Fig. 8.

The arm 28 may be pressed by hand or pulled by a spring if required, in the direction to keep pin 50 in contact with the templet 45, and as this latter is rotated in unison with the work piece 20, the nozzle 132 is compelled to follow the outline of the templet, so that the work piece is cut out to the same shape.

It may be stated here that the flame cuts slots of different widths in the plates according to the rate of cutting, which varies with the thickness of metal to be cut through. If this were to be allowed for by making templets of a larger size therefore, apart from the difficulty of increasing the dimensions of a pattern correctly to make such allowance, there would be the difficulty that patterns of different sizes would be needed for each different thickness of plate to be cut. By the construction according to this invention, patterns or templets true to scale can be used, the allowance for the width of the cutting slot being made by interchanging the pins 50 in the cutter head, putting in a pin of larger diameter for use when cutting a thicker plate, and a pin of smaller diameter for use when cutting a thinner plate. A set of such pins will be provided for use when cutting respective thicknesses of plates, of all the usual gages, the pins being of sizes such as to allow both for the widths of cutting slots, and for any necessary metal required to be left for subsequent machining or finishing operations. The pin 50 must of course be directly above the cutter nozzle 132, in order that the operation may be exact with this method of working.

Figure 10:
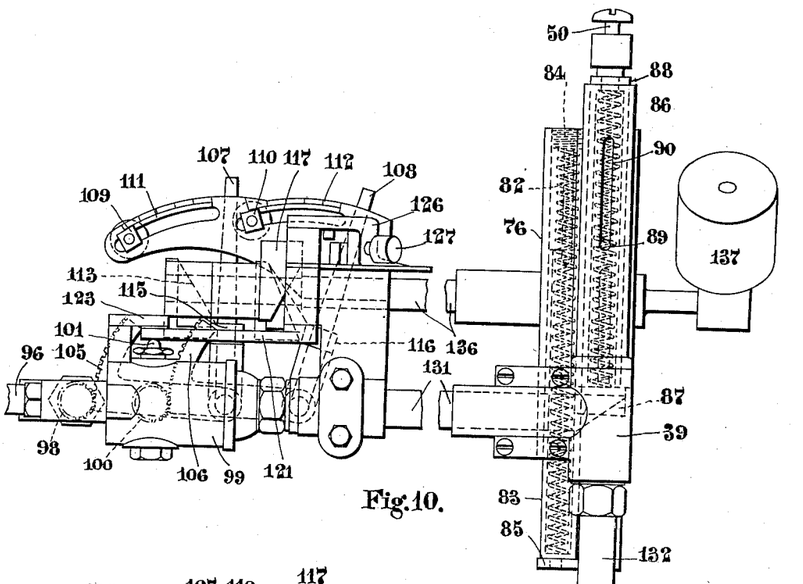
Fig. 10 shows in side elevation, partly broken away, the preferred form of cutter head for use with oxy-acetylene.
Figure 11:
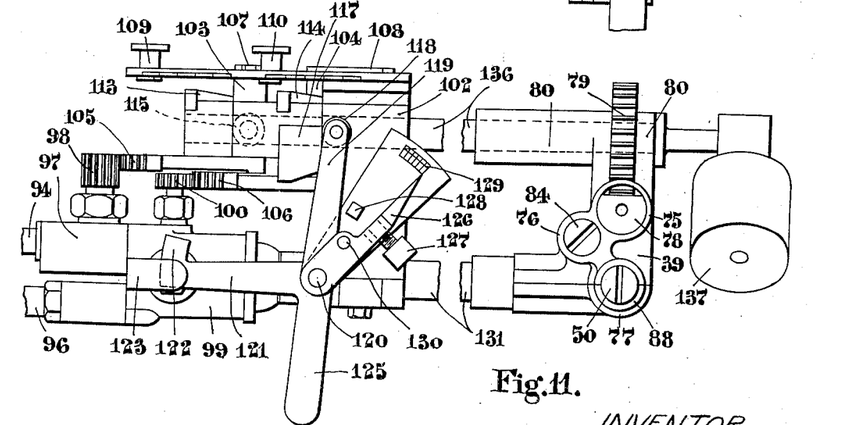
Fig. 11 shows a plan view of Fig. 7.
Figure 12:
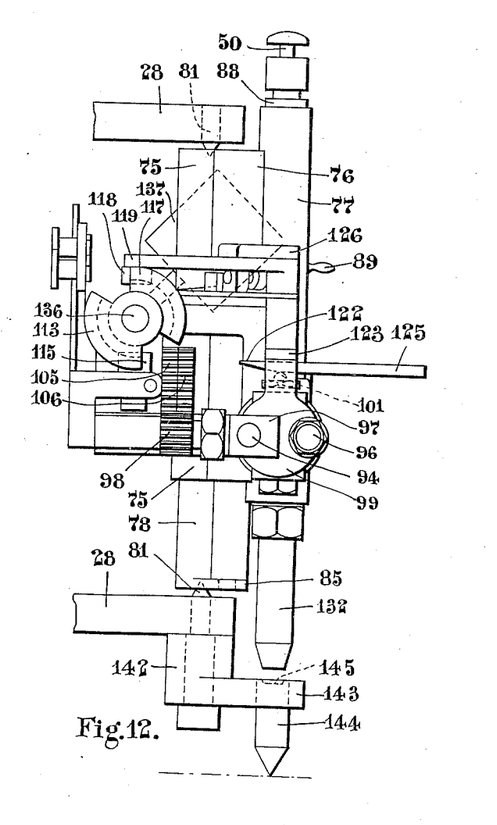
Fig. 12 an end elevation thereof, as seen from the rear end.

The preferred construction of the cutter head is shown in Figs. 10, 11 and 12, together with its controlling mechanism. The head 39 has three tubular sockets 75, 76, 77, which are seen clearly in Fig. 11. In socket 75 slides a rack bar 78, shown in the plan view, Fig. 11, this rack bar being engaged by a toothed wheel or sector 79 mounted on shaft 136 between the arms of a bracket 80 which carries said shaft on the cutter head 39. The bar 78 is engaged at its top and bottom ends by hard steel center pins 81 on the ends of the arms 28 of the link frame, so that when the weighted handle 137 is thrown over toward one side, the wheel 79 gearing with rack bar 78 tends to lift the cutter head with respect to the swinging supporting frame, and when the handle 137 is thrown over toward the other side it allows the cutter head 39 to fall with respect to the frame. The upward movements of the cutter head are counterbalanced and limited by a spring 82 arranged inside a hollow plunger 83 in socket 76 of the cutter head, said spring bearing at the top against a plug 84 screwed into socket 76; the hollow plunger rests at its lower end on an arm or bracket 85 projecting laterally from the lower end of the rack bar 78, so that the plunger 83 always remains at the same height in the end of frame 28, and the spring tends to push the cutter head upward. When the weighted handle 137 is in one position, its weight counterbalances the pressure of spring 82, causing the cutter head to fall until the top of the hollow plunger 83 comes against the screw plug 84, or until any other adjustable stopping means comes into operation to limit the downward movement of the cutter head 39. The nozzle 132 is then at a level such that its end is only a small fraction of an inch above the work piece ready to begin the cutting operations. When the weighted handle 137 is thrown over the other way, it allows spring 82 to raise the cutter head 39 to the extent allowed by the mechanism associated with shaft 136. In the third socket 77 is a spring 86 which rests at its lower end on a shoe 87 bearing on the end of pipe 131, or another abutment in the cutter head, while it is disposed inside a hollow plunger 88 against the head of which it bears, tending to press it up with respect to the cutter head 39. The movement of the plunger 88 is limited by a pin 89 passing through a slot at 90 and fixed into the plunger 88. This pin can be used at any time as a finger piece for pulling down the plunger 88. The said plunger has the pin 50 screwed into the top thereof, and it is necessary to draw down the plunger in order to engage this pin in the socket of shoe 38 Fig. 2, or cutter head holder 168, Fig. 4, or in any similar controlling member. When pin 50 is working against a templet 45, the spring 86 keeps the shoulder of the top of the plunger 88 against the face of the templet while the pin follows its contour edges.

With an oxy-acetylene jet used for cutting purposes it is necessary to supply first a mixture of acetylene and of oxygen for heating the work to a high temperature, and then the pure oxygen jet may be turned on. The nozzle has an annular slot for the oxy-acetylene heating-flame mixture, and generally a small central jet for the pure oxygen. This latter continues the burning through of the metal by oxidation.

The acetylene is introduced through pipe 94. Oxygen is introduced by pipe 96. A shut-off valve for the acetylene is contained in socket 97, and is turned to cut off the gas when required by pinion 98 as hereinafter described. In the socket 99 the oxygen supplied is divided into two streams, that for the heating flame mixture being cut off when required by a valve controlled by a pinion 100, while that for the burning jet is controlled by a spring valve, the stem 101 of which is pressed inward to any extent required to vary the stream of oxygen. Cocks for controlling the feed of oxygen and of acetylene for heating, and a spring pressed valve for controlling the oxygen for burning, are commonly used in connection with oxy-acetylene cutting apparatus, the spring-pressed valve being usually controlled by a handle gripped to press it inward as required. The interior of the sockets 97, 99, the pipe 131, and the nozzle 132, may all be of usual form, and they form no part of this invention, but the invention comprises the means for controlling the valves to cut off the flame simultaneously with the raising of the cutter head by the throwing over of the weighted lever, and only the mechanism for that purpose, which is associated with an arrangement for adjusting the strength of the cutter flame, will need to be described here.

A casting 102 through which the shaft 136 passes, carries the valve sockets 97, 99, and the bearings 103, 104, for two rockers, each of which has on one end an arm provided with a toothed sector 105, 106, respectively gearing with pinions 98 and 100 of the acetylene and oxygen cut-off valves. The rockers have at their other ends finger levers 107 and 108 which can be operated by hand when required to open the acetylene and the oxygen valves respectively. The degree of opening allowed can be determined by adjusting clamping stops 109, 110, in the slots of graduated segmental guide brackets 111 and 112 projecting from the casting 102 beside the finger levers 107 and 108. On the end of shaft 136 are two face cams 113 and 114, and arms projecting from the rockers carry rollers 115 and 116 adapted to be operated by these cams to turn the rockers, move the finger levers 107, 108, back to their zero positions (where they are shown in Figs. 10 and 11) and cut off the acetylene and oxygen respectively at the valves controlled by pinions 98 and 100, through the operation of toothed segments 105, 106. The one cam can be adjusted relatively to the other so that the one gas can be cut off slightly before the other so as to avoid risk of back-firing in the burner.

A very similar arrangement is provided for controlling the separate valve for the burning oxygen. A cam 117 on the shaft 136 acts on a roller 118 on the end of a lever arm 119. This arm is pivotally supported on the upwardly projecting spindle 120 of a lever 121, which lever has a segmental end 122 formed on its inner face as a cam for pressing inward the spring valve 101 controlling the oxygen supply. A bracket 123 serves to support the segmental cam from the rear while it operates the valve, and the lever is operated by a handle 125 to open the valve to any required extent. To adjust the maximum opening allowed, the spindle 120 has an arm 126 secured on its upper end, above the hub of lever 119, this arm having a set screw 127 which can be set to contact with a stop 128 when the pointed end of arm 126 is at any division on the fixed scale 129. A pin 130 on arm 126 projects into the path of lever 119, and when the cam 117 presses lever 119 back, the side of this lever engages pin 130 moving the arm 126 back to its zero position as in Fig. 11, and turning the arm 121 to the position in which cam face 122 releases the spring valve stem 101 completely, cutting off the oxygen supply.

Whenever the weighted lever 137 is thrown over to lower the cutter head to the working position, the shaft 136 is turned so that all the rollers 115, 116 and 118 are free, and their levers can be moved by hand. In starting the burner, the acetylene is turned on first by lever 107, then oxygen by lever 108. Finally, the cutting oxygen is turned on by handle 125. In cutting off the gases of the oxy-acetylene flame, the oxygen should be cut off first, so that cam 114 is adjusted to operate segment 106 a little before segment 105 operates to cut off the acetylene. The burning oxygen is generally cut off first of all, of course, by cam 117.

In order to prevent the cutter head from approaching the work by more than a predetermined distance, a distance member is provided on the lower frame member 28 in close proximity to the nozzle 132. This distance member in the form shown in Fig. 12 also serves as a tracer whereby the point where the cutting is to start can be marked or the path to be followed by the cutting flame can be traced out beforehand. The construction shown in Fig. 12 comprises a boss 142 mounted on the shank of the pivot 81. From this boss projects an arm 143, which carries a vertical tracer member 144, the distance between the center line of the tracer member and the pivot center 81 being equal to that between the center line of nozzle 132 and the pivot center 81. The nozzle 132 is chamfered to fit in a corresponding countersunk recess at 145 in the member 144. When the distance member is to act as a tracer point the nozzle 132 is lowered into the countersunk recess at 145 so that the member 144 will follow the movements of the cutter head. When the distance member is to act only as such the nozzle 132 is raised therefrom and the member swung out of the way of the nozzle. The nozzle can then be brought down to the proper distance from the work, say 3/64", and the tracer 144 will maintain this distance accurately in spite of any slight irregularities or curvature, for example in the surface of the work.

Figure 13:
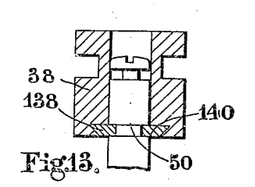
Figs. 13 and 14 show a sectional elevation and plan respectively of one form of cutter head holder.
Figure 14:
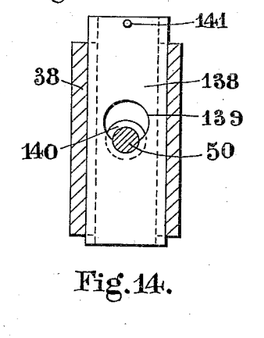

When the cutter head is used in the holder 38 (Figs. 1 and 2) it is locked in position by means of a small sliding member 138 (shown in detail in Figs. 13 and 14) having a hole formed at 139 for permitting the end of the cutter head to pass through, and having a circular recess formed on one side of the hole which can engage in a groove formed at 140 of the pin 50 of the cutter head. When the cutter head is to be held the member 138 is moved until the stop 141 abuts against the member 38. The hole at 139 then coincides with the hole in the member 38 and the pin 50 can be inserted, after which the slide member 138 is moved into the position shown in Fig. 14, holding the cutter head engaged in the holder 38.

Although the controlling arrangement for the oxy-acteylene burner has been described in detail, it will be understood that the invention is not limited to the use of oxyacetylene for cutting purposes, as other gas flames may be used.

With the machine as described, it will be seen that the cutter head can be moved about freely within the range of the linked frame 26, 28, and is either positively guided or only has to be held by the operator against a templet around which it is moved. The machine is therefore very easy to work, while it can be used as already pointed out for cutting out work of a great variety of shapes and sizes. In fact such a machine may probably become a universal cutting machine, for use in all engineering workshops, replacing all other methods of cutting out as hitherto practised.

The invention is not limited to the precise details of construction shown in the drawings, as these can be modified in many respects without departing from the scope of the invention.

Having thus described my invention, what I claim as new and desire to secure by Letters Patent is:—

1. A machine for use in cutting metals to a great variety of shapes and patterns by a cutting flame, comprising suitable supporting and clamping appliances for holding and adjusting the work-piece, a column, a jointed frame with means for mounting it on said column so that it can swing only in a plane parallel to the face of the work, a cutter head having a burner nozzle mounted on said frame, a projection above said cutter head and in alinement with the burner nozzle adapted to coöperate with guiding means for controlling the movement of said cutter head, an arm, and means supported by said arm above said cutter head for coöperating with said projection on the cutter head.

2. A machine for use in cutting metals to a great variety of shapes and patterns by a cutting flame, comprising suitable supporting and clamping appliances for holding and adjusting the work-piece, a column, a jointed frame with means for mounting it on said column so that it can swing only in a plane parallel to the face of the work, a cutter head having a burner nozzle mounted on said frame, a projection above said cutter head and in alinement with the burner nozzle adapted to coöperate with guiding means for controlling the movement of said cutter head, an arm, and means supported by said arm above said cutter head for coöperating with said projection on the cutter head to control the movements of the cutter head around a pattern, and separate means for controlling the movements of the cutter head along guides in any required direction.

3. A machine for use in cutting metals to a great variety of shapes and patterns by a cutting flame, comprising suitable supporting and clamping appliances for holding and adjusting the work-piece, a column, a jointed frame with means for mounting it on said column so that it can swing only in a plane parallel to the face of the work, a cutter head mounted on said frame, a plunger, means for pressing up said plunger in the cutter head, an interchangeable pin mounted on the head of said plunger, adapted to work around a pattern, an arm, and means supported by said arm above said cutter head adapted to hold a pattern.

4. A machine for use in cutting metals to a great variety of shapes and patterns by a cutting flame, comprising suitable supporting and clamping appliances for holding and adjusting the work piece, a column, a jointed frame with means for mounting it on said column so that it can swing only in a plane parallel to the face of the work, a cutter head having a burner nozzle mounted on said frame, a projection above said cutter head and in alinement with the burner nozzle adapted to coöperate with guiding means for controlling the movement of said cutter head, an arm, and means supported by said arm above said cutter head for coöperating with said projection on the cutter head ' enable the cutter head to be carried in a .'rcular path of any required size, said attachment including a swing member, and a socket member adjustable in a guide to any distance from the turning center.

5. A machine for use in cutting metals to a great variety of shapes and patterns by a cutting flame, comprising suitable supporting and clamping appliances for holding and adjusting the work piece, a column, a frame with means for mounting it on said column so that it can swing only in a plane parallel to the face of the work, a cutter head mounted on said frame, an attachment with means for supporting it on the column, adapted to enable the cutter head to be carried in a circular path of any required size, said attachment including a swing member and worm operating gear therefor, and a socket member adjustable in a guide to any distance from the turning center.

6. A machine for use in cutting metals to a great variety of shapes and patterns by a cutting flame, comprising suitable supporting and clamping appliances for holding and adjusting the work piece, a column, a jointed frame with means for mounting it on said column so that it can swing only in a plane parallel to the face of the work, a cutter head having a burner nozzle mounted on said frame, a projection above said cutter head and in alinement with the burner nozzle adapted to coöperate with guiding means for controlling the movement of said cutter head, an arm, an attachment supported by said arm above said cutter head adapted to allow the cutter head to be carried in a circular path of any required size, a revoluble compound slide carrying said attachment, said attachment comprising a swing member and a socket member adjustable to any distance from the turning center.

7. A machine for use in cutting metals to a great variety of shapes and patterns by a cutting flame, comprising a vise for clamping the work piece, including a top jaw at the height at which the upper surface of the work piece is to be with respect to the cutter head and in which the work is adapted to be clamped upwardly from beneath, a column. a jointed frame with means for mounting it on said column so that it can swing only in a plane parallel to the face of the work, a cutter head having a burner nozzle mounted on said frame, a projection above said cutter head and in alinement with the burner nozzle adapted to coöperate with guiding means for controlling the movement of said cutter head, an arm, and means supported by said arm above said cutter head for coöperating with said projection on the cutter head.

8. A machine for use in cutting metals to a great variety of shapes and patterns by a cutting flame, comprising suitable supporting and clamping appliances for holding and adjusting the work-piece, a column, a jointed frame with means for mounting it on said column so that it can swing only in a plane parallel to the face of the work, a cutter head having a burner nozzle mounted on said frame, a device adapted to lift the cutter head away from the work whenever the cutting is to be stopped, a projection above said cutter head and in alinement with the burner nozzle adapted to coöperate with guiding means for controlling the movement of said cutter head, an arm, and means supported by said arm above said cutter head for coöperating with said projection on the cutter head.

9. A machine for use in cutting metals to a great variety of shapes and patterns by a cutting flame, comprising suitable supporting and clamping appliances for holding and adjusting the work piece, a column, a jointed frame with means for mounting it on said column so that it can swing only in a plane parallel to the face of the work, a cutter head having a burner nozzle mounted on said frame, a device adapted to lift the cutter head away from the work whenever the cutting is to be stopped, and in combination therewith mechanism for cutting off the supply of gases from the burner whenever the cutting head is raised, a projection above said cutter head and in alinement with the burner nozzle adapted to coöperate with guiding means for controlling the movement of said cutter head, an arm, and means supported by said arm above said cutter head for coöperating with said projection on the cutter head.

10. A machine for use in cutting metals to a great variety of shapes and patterns by a cutting flame, comprising suitable supporting and clamping appliances for holding and adjusting the work piece, a column, a jointed frame with means for mounting it on said column so that it can swing only in a plane parallel to the face of the work, a cutter head having a burner nozzle mounted on said frame, a shaft with a weighted handle mounted on said cutter head, a rack bar in the supporting frame, gearing means between the rack bar and shaft, said handle being adapted to be thrown over into one position for lifting the cutter head, and into another position for lowering the same, counterbalancing and cushioning means for the moving cutter head, a projection above said cutter head and in alinement with the burner nozzle adapted to coöperate with guiding means for controlling the movement of said cutter head, an arm, and means supported by said arm above said cutter head for coöperating with said projection on the cutter head.

11. A machine for use in cutting metals to a great variety of shapes and patterns by a cutting flame, comprising suitable supporting and clamping appliances for holding and adjusting the work piece, a column, a jointed frame with means for mounting it on said column so that it can swing only in a plane parallel to the face of the work, a cutter head having a burner nozzle mounted on said frame, a shaft with a weighted handle mounted on said cutter head, a rack bar in the supporting frame, gearing means between the rack bar and said shaft, cams on said shaft, cut-off valves for controlling the supply of gases to the cutter head, mechanism adapted to be operated by said cams to close said cut-off valves when the shaft is turned in a direction to raise the cutter head, such valves being adapted to be opened by hand only when the cutter head is in its lowered position, a projection above said cutter head and in alinement with the burner nozzle adapted to coöperate with guiding means for controlling the movement of said cutter head, an arm, and means supported by said arm above said cutter head for coöperating with said projection on the cutter head.

12. A machine for use in cutting metals to a great variety of shapes and patterns by a cutting flame, comprising suitable supporting and clamping appliances for holding and adjusting the work piece, a column, a jointed frame with means for mounting it on said column so that it can swing only in a plane parallel to the face of the work, a cutter head having a burner nozzle mounted on said frame, a shaft with a weighted handle mounted on said cutter head, a rack bar in the supporting frame, gearing means between the rack bar and said shaft, cams on said shaft, cut-off valves for controlling the supply of gases to the cutter head, mechanism adapted to be operated by said cams to close said cut-off valves when the shaft is turned in a direction to raise the cutter head, a finger lever associated with each valve, a scale beside each finger lever and adjustable stops adapted to limit the movements of said finger levers in opening their corresponding valves, a projection above said cutter head and in alinement with the burner nozzle adapted to coöperate with guiding means for controlling the movement of said cutter head, an arm, and means supported by said arm above said cutter head for coöperating with said projection on the cutter head.

13. A machine for use in cutting metals to a great variety of shapes and patterns by a cutting flame, comprising suitable supporting and clamping appliances for holding and adjusting the work piece, a column, a jointed frame with means for mounting it on said column so that it can swing only in a plane parallel to the face of the work, a cutter head having a burner nozzle mounted on said frame, a combined distance piece and tracer mounted on said frame and adjacent to said cutter head, a projection above said cutter head and in alinement with the burner nozzle adapted to coöperate with guiding means for controlling the movement of said cutter head, an arm, and means supported by said arm above said cutter head for coöperating with said projection on the cutter head.

14. A machine for use in cutting metals to any required shape or pattern by a cutting flame, comprising supporting and clamping means for holding and adjusting the work to be cut, a column, a cutter head comprising a burner nozzle and means for supplying gas thereto, supporting means comprising a jointed frame adapted to carry said cutter head from the column and to allow of its movement to any required position over the work to be cut, an arm pivotally supported adjacent to the burner nozzle, a tracer pin carried by said arm in such a position that the arm can be brought with the tracer pin directly beneath the burner nozzle, said tracer pin being formed with a recess to receive said nozzle whereby the nozzle can be exactly positioned with respect to the work before the commencement of a cutting operation, said tracer pin being also adapted when turned away from the nozzle, to form a distance piece insuring the maintenance of the required distance between the nozzle and the work, while the cutter head is being moved with respect to the work.

15. A machine for use in cutting metals to any required shape or pattern by a cutting flame, comprising supporting and clamping means for holding and adjusting the work to be cut, a column, a cutter head comprising a burner nozzle and means for supplying gas thereto, supporting means comprising a jointed frame adapted to carry said cutter head from the column and to allow of its movement to any required position over the work to be cut, mechanism adapted to be used for raising and lowering the burner nozzle in its support when required, an arm pivotally supported adjacent to the burner nozzle, a tracer pin carried by said arm in such a position that the arm can be brought when the burner nozzle is raised with the tracer pin directly beneath the burner nozzle, said tracer pin being formed with a recess to receive said nozzle when partially lowered, whereby the nozzle can be exactly positioned with respect to the work before the commencement of a cutting operation, said tracer pin being also adapted when turned away from the nozzle, and when the nozzle is lowered into its normal working position, to form a distance piece, insuring the maintenance of the required distance between the nozzle and the work, while the cutter head is being moved with respect to the work.

16. A machine for use in cutting metals by a cutting flame, comprising a base, a supporting column mounted on said base, a work-table adjustably fastened on said base, a sleeve on said supporting column, a jointed frame hinged to said sleeve and consisting of two parts pivoted to one another, a cutter head having a burner nozzle pivotally mounted at the outer end of said jointed frame, a projecting stem above said cutter head and in alinement with the burner nozzle, a headed pin on said stem, a radial arm revolubly mounted on said supporting column, a slide member adjustably mounted on the outer end of said radial arm, detents for setting said member to predetermined angular positions, a cross slide slidably mounted on said slide member, a shoe slidably mounted in said cross slide and means in said shoe for engaging the stem of the cutter head, a second member adjustably mounted on said slide member, a horizontal plate mounted on said second member adapted to carry a pattern and a distance piece on said plate whereby a space is left between the pattern and the plate for accommodating the headed pin on the cutter head stem.

17. A machine for use in cutting metals by a cutting flame comprising a base, a supporting column mounted on said base, a work table adjustably fastened on said base, a sleeve on said supporting column, a jointed frame hinged to said sleeve and consisting of two parts pivoted to one another, a cutter head pivotally mounted at the outer end of said jointed frame, a projecting stem on said cutter head, a headed pin on said stem, a radial arm revolubly mounted on said supporting column, a slide member adjustably mounted on the outer end of said radial arm, detents for setting said member to predetermined angular positions, a cross slide slidably mounted on said slide member, adjustable stops on said sliding member and cross slide, a sliding member on said cross slide, a swing member slidably mounted on said cross slide, a shoe slidably mounted on said swing member, means thereon for holding the cutter head and means for locking the swing member in position when not in use as such.

18. In combination, a jointed frame, supporting means therefor and a pivotal connection between said supporting means and said jointed frame, a cutter head having a burner nozzle mounted on said jointed frame, a projection above said cutter head and in alinement with the burner nozzle adapted to coöperate with guiding means for controlling the movement of said cutter head, an arm, and means supported by said arm above said cutter head for coöperating with said projection on the cutter head.

ALFRED GODFREY.